United States Patent
Torres et al.

(10) Patent No.: US 10,722,830 B2
(45) Date of Patent: Jul. 28, 2020

(54) INTEGRATED PITOT TUBE AND FLUID PICKUP PORT IN ROTARY SEPARATOR

(71) Applicant: Hamilton Sundstrand Corporation, Charlotte, NC (US)

(72) Inventors: Miguel Angel Torres, S. Windsor, CT (US); Roberto Woods, South Windsor, CT (US); Jonathan Daniel O'Neill, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 321 days.

(21) Appl. No.: 15/872,479

(22) Filed: Jan. 16, 2018

(65) Prior Publication Data

US 2019/0217236 A1    Jul. 18, 2019

(51) Int. Cl.
| | | |
|---|---|---|
| *B01D 45/14* | (2006.01) | |
| *B01D 45/18* | (2006.01) | |
| *G05D 7/06* | (2006.01) | |
| *B01D 19/00* | (2006.01) | |

(52) U.S. Cl.
CPC ......... *B01D 45/18* (2013.01); *B01D 19/0026* (2013.01); *B01D 19/0052* (2013.01); *B01D 45/14* (2013.01); *G05D 7/0635* (2013.01); *G05D 7/0623* (2013.01)

(58) Field of Classification Search
CPC .... B01D 45/18; B01D 45/14; B01D 19/0052; B01D 19/0026; G05D 7/0635; G05D 7/0623
USPC ...... 95/19, 261; 96/196, 157, 174, 177, 210, 96/214; 55/218, 317, 318, 402, 409, 417; 210/512.1, 512.3
See application file for complete search history.

(56) References Cited

U.S. PATENT DOCUMENTS

| | | | |
|---|---|---|---|
| 3,828,524 A | | 8/1974 | Booth et al. |
| 4,516,987 A | * | 5/1985 | Niggemann ............ F42B 19/20 114/20.1 |
| 4,679,980 A | * | 7/1987 | Bland ..................... F25B 31/00 415/24 |
| 5,332,501 A | * | 7/1994 | Mangialardi ...... B01D 19/0052 210/512.3 |
| 5,693,125 A | * | 12/1997 | Dean .................. B01D 19/0052 55/317 |
| 6,713,028 B1 | * | 3/2004 | Oklejas, Jr. ............ B01D 63/16 422/130 |

(Continued)

FOREIGN PATENT DOCUMENTS

| | | | | |
|---|---|---|---|---|
| CN | 105642453 | | 6/2016 | |
| EP | 0287035 | * | 4/1988 | ............ B01D 19/00 |
| EP | 2787217 | | 10/2014 | |

OTHER PUBLICATIONS

European Patnet Office, European Search Report dated May 22, 2019 in Application No. 19151830.7.

*Primary Examiner* — Minh Chau T Pham
(74) *Attorney, Agent, or Firm* — Snell & Wilmer L.L.P.

(57) ABSTRACT

A rotary separator includes a drum configured to rotate, and a pickup member extending into the drum. The pickup member includes a pickup channel having a first inlet for receiving a liquid, and a pitot channel having a second inlet for receiving the liquid. The liquid exits the drum through the pickup channel in response to a pressure of the liquid being measured through the pitot channel. A valve may be coupled to the pickup channel. A pressure sensor may be coupled to the pitot channel.

17 Claims, 3 Drawing Sheets

(56) References Cited

U.S. PATENT DOCUMENTS

2014/0290486 A1\* 10/2014 Todd, IV ............ F04D 15/0005
95/261
2017/0074696 A1\* 3/2017 Neilson .................... G01F 1/46

\* cited by examiner

INTEGRATED PITOT TUBE AND FLUID PICKUP PORT IN ROTARY SEPARATOR

FIELD

The disclosure generally relates to rotary separators, and more particularly to systems and methods for inferring the amount of liquid in a rotary separator.

BACKGROUND

Rotary separators are used in microgravity environments to separate a liquid and gas mixture. During the operation of a typical rotary separator, a vortical flow is developed in the process stream as it flows through a rotating drum. The fluid is subject to an inertial acceleration field, resulting in centrifugal forces directed radially outward towards the inner surface of the drum. The substances having relatively high densities in the vortical flow stream, such as liquids, are subject to the highest centrifugal forces. Thus, liquids present in the flow stream are centrifuged and captured against the inner surface of the drum, thereby radially separating the liquids (high-density substances) from the gas (low density substances). As a result, a "clean" or substantially non-liquid-transporting gas flow stream exits axially from the drum and flows downstream of the rotary separator.

SUMMARY

A pickup tube for a rotary separator is disclosed, comprising a pickup member, a pickup channel disposed through the pickup member, and a pitot channel disposed through the pickup member, wherein the pickup channel is configured to receive a liquid from the rotary separator, and the pitot channel is configured to receive the liquid from the rotary separator.

In various embodiments, the pickup member comprises a first orifice defining the pickup channel, and a second orifice defining the pitot channel.

In various embodiments, the pickup member comprises a single piece.

In various embodiments, the pickup member comprises a third flow channel through which the rotary separator receives a fluid.

In various embodiments, the fluid comprises a liquid.

A rotary separator is disclosed, comprising a drum configured to rotate, a pickup member extending into the drum, comprising a pickup channel having a first inlet for receiving a liquid, and a pitot channel having a second inlet for receiving the liquid, wherein the liquid exits the drum through the pickup channel in response to a pressure of the liquid being measured through the pitot channel.

In various embodiments, the rotary separator further comprises a valve coupled to the pickup channel.

In various embodiments, the rotary separator further comprises a pressure sensor coupled to the pitot channel.

In various embodiments, the valve moves to an open position in response to the pressure of the liquid being greater than a first threshold value.

In various embodiments, the valve moves to a closed position in response to the pressure of the liquid being less than a second threshold value.

In various embodiments, the first threshold value and the second threshold value are pre-determined values.

In various embodiments, the drum comprises an inlet and an exit.

In various embodiments, the drum is configured to receive the liquid through the inlet and a gas through the inlet, wherein the gas exits the drum through the exit.

In various embodiments, the pickup member comprises a first orifice defining the pickup channel, and a second orifice defining the pitot channel.

In various embodiments, the first orifice and the second orifice are disposed at a radial location from a centerline axis of the drum.

A method for draining a liquid from a rotary separator is disclosed, comprising receiving, by a controller, a pressure signal from a pressure sensor, and sending, by the controller, a valve command to a valve in response to the pressure signal being above a threshold value, wherein the valve actuates between a closed position and an open position in response to the valve command.

In various embodiments, the valve is in fluid communication with a pickup channel of the rotary separator.

In various embodiments, the pressure sensor is in fluid communication with a pitot channel of the rotary separator.

In various embodiments, the pickup channel is at least partially defined by a first orifice disposed within a drum of the rotary separator, and the pitot channel is at least partially defined by a second orifice disposed within the drum of the rotary separator.

In various embodiments, the method further comprises, receiving, by the controller, a second pressure signal, and sending, by the controller, a second valve command to the valve in response to the second pressure signal being below a second threshold value, wherein the valve actuates between the open position and the closed position in response to the second valve command.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Rotary separators may be used in microgravity environments to separate a liquid and gas mixture. An accurate measurement of the pressure generated by the liquid at the head of the pickup tube may ensure proper operation of these devices.

A rotary separator, as disclosed herein, may comprise a pickup member having a first channel for draining a liquid from the rotary separator and a second channel for sensing a pressure of the liquid. A rotary separator, as disclosed herein, may simultaneously prevent valve chattering, drum overflow, and excessive gas inclusion.

Figure 1:
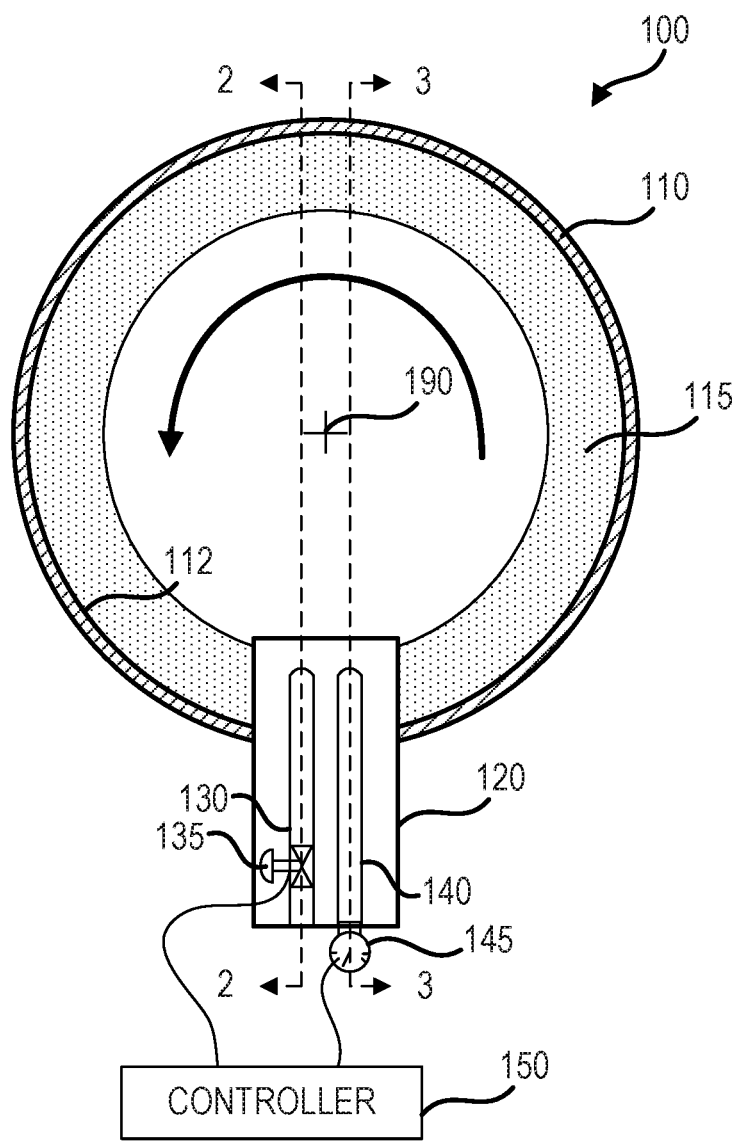
FIG. 1 illustrates a schematic view of a rotary separator having a pickup member defining a pickup channel and a pitot channel, in accordance with various embodiments.

With reference to FIG. 1, a rotary separator 100 is illustrated, in accordance with various embodiments. Rotary separator 100 may comprise a drum 110 configured to rotate about a centerline axis 190. During operation of rotary separator 100, a vortical flow may be developed in a fluid as it flows through rotating drum 110. The fluid may be subject to an inertial acceleration field, resulting in centrifugal forces directed radially outward towards inner surface 112 of drum 110. Substances having relatively high densities in the vortical flow stream, such as liquids for example, may be subject to the highest centrifugal forces. Thus, liquids present in the flow stream may be centrifuged and captured against inner surface 112 of drum 110, thereby radially separating the liquids (high-density substances) from the gas (low density substances). In this regard, a liquid ring 115 may form against inner surface 112.

In various embodiments, rotary separator 100 may comprise a pickup member 120. In various embodiments, pickup member 120 may comprise of metal. In various embodiments, pickup member 120 may comprise a shroud. In various embodiments, pickup member 120 may comprise a hydrodynamic foil. A pickup channel 130 may be disposed in pickup member 120. Pickup channel 130 may provide an exit for liquid (e.g., liquid ring 115) within drum 110. A valve 135 may be coupled to pickup channel 130. Valve 135 may be actuated between an open position and a closed position. The position of valve 135 may be determined in response to the pressure of liquid ring 115. In this regard, valve 135 may be in fluid communication with pickup channel 130.

A pitot channel 140 may be disposed in pickup member 120. Pitot channel 140 may provide a channel through which the pressure of liquid ring 115 may be measured. In various embodiments, pickup member 120 may comprise a casing for pitot channel 140 and pickup channel 130. As will be discussed with greater detail herein, an inlet to pitot channel 140 may be in close proximity to the inlet of pickup channel 130. In this regard, the pressure measured by pressure sensor 145 may be substantially equal to the pressure of the liquid at the inlet of pickup channel 130.

Pressure sensor 145 may be used to control valve 135. As liquid fills drum 110, the sensed pressure may rise. When the pressure exceeds a pre-determined threshold value (also referred to herein as a first threshold value), valve 135 may open, and, consequently, the liquid may begin to drain from drum 110. This may prevent overflow of drum 110. When the pressure of the liquid falls below a pre-determined threshold value (also referred to herein as a second threshold value), valve 135 may close to maintain a minimum amount of liquid in the drum. This may prevent excessive gas inclusion in the liquid outflow. In this regard, pressure sensor 145 may be in fluid communication with pitot channel 140.

In various embodiments, proper operation of rotary separator 100 may depend on accurate estimation of the amount of liquid in drum 110. When there is no liquid flowing through pickup channel 130, the downstream pressure is equal to the pressure at the inlet of pickup channel 130, which may be a good indication of the total pressure of the liquid that moment. However, when liquid is flowing through pickup channel 130, the pressure at the downstream location may not be the same as the pressure at the inlet of pickup channel 130. This may be due to the pressure losses incurred by the liquid as it travels from the inlet to a downstream location of pickup channel 130.

Thus, in response to valve 135 opening and liquid starting to flow through pickup channel 130, the pressure may drop instantaneously. Thus, by providing a separate channel (i.e., pitot channel 140) for measuring the pressure of liquid ring 115, an accurate measurement of the pressure of liquid ring 115 may be determined since pitot channel 140 does not experience the flow losses experienced by pickup channel 130. This may prevent rapid opening and closing ("chattering") of valve 135.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, rotary separator 100 may include a controller 150. Pressure sensor 145 and valve 135 may be in electrical communication with controller 150. Controller 150 may be configured to receive a pressure signal from pressure sensor 145 which may indicate the pressure of pitot channel 140. Controller 150 may be configured to send a valve command signal to valve 135 in response to the pressure signal. For example, controller 150 may send a first valve command signal (e.g., a voltage signal or a current signal) to valve 135 in response to the pressure signal being above a first threshold value. Consequently, valve 135 may open in response to receiving the first valve command signal from controller 150. Controller 150 may send a second valve command signal (e.g., a voltage signal or a current signal) to valve 135 in response to the pressure signal being below a second threshold value. Consequently, valve 135 may close in response to receiving the second valve command signal from controller 150.

Figure 2:
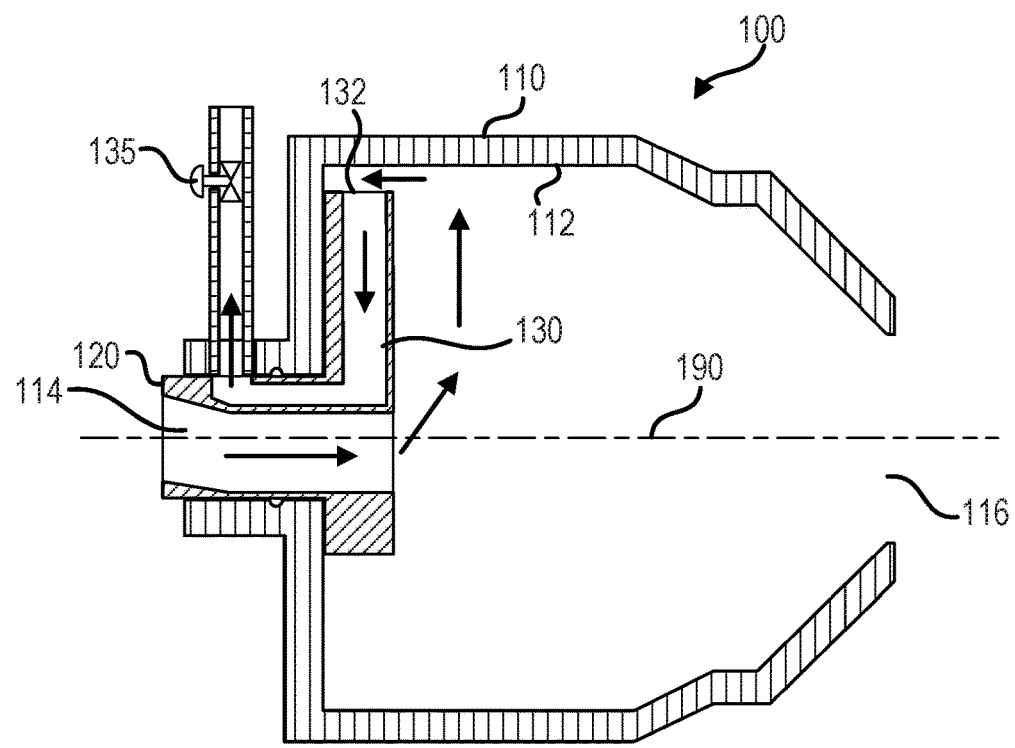
FIG. 2 illustrates a cross-section view of the pickup channel, in accordance with various embodiments.

With reference to FIG. 2, a cross-sectional view of rotary separator 100 at pickup channel 130 is illustrated, in accordance with various embodiments. Pickup channel 130 may comprise an inlet (also referred to herein as a first inlet or a first orifice) 132. Liquid may enter pickup channel 130, through inlet 132, and may exit drum 110 via pickup channel 130.

In various embodiments, drum 110 may comprise an inlet 114 and an exit 116. Fluid may enter drum 110 via inlet 114. Gas may exit drum 110 via exit 116. In various embodiments, inlet 114 may be defined by pickup member 120.

Figure 3:
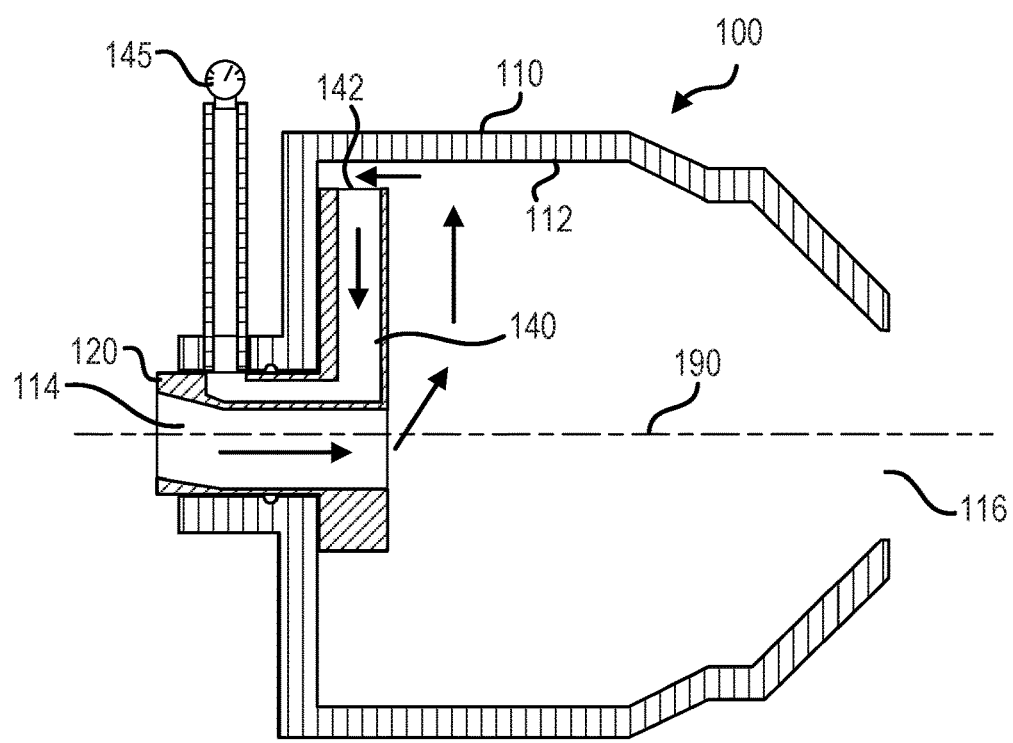
FIG. 3 illustrates a cross-section view of the pitot channel, in accordance with various embodiments.

With combined reference to FIG. 2 and FIG. 3, inlet 132 and inlet 142 may be disposed at a radial location from centerline axis 190. Stated differently, inlet 132 and inlet 142 may be disposed at an equal distance from centerline axis 190. By disposing inlet 132 and inlet 142 at similar radial locations, the pressure at inlet 132 and inlet 142 may be the same. Inlet 132 and inlet 142 may be disposed at an axial location with respect to centerline axis 190. In this regard, inlet 132 and inlet 142 may be disposed circumferentially adjacent to each other.

With respect to FIG. 3, elements with like element numbering, as depicted in FIG. 2, are intended to be the same and will not necessarily be repeated for the sake of clarity.

With reference to FIG. 3, a cross-sectional view of rotary separator 100 at pitot channel 140 is illustrated, in accordance with various embodiments. Pitot channel 140 may comprise an inlet (also referred to herein as a second inlet or a second orifice) 142. Liquid may enter pitot channel 140, through inlet 142. Pitot channel 140 may be devoid of an exit. Stated another way, liquid may not flow through pitot channel 140.

Figure 4:
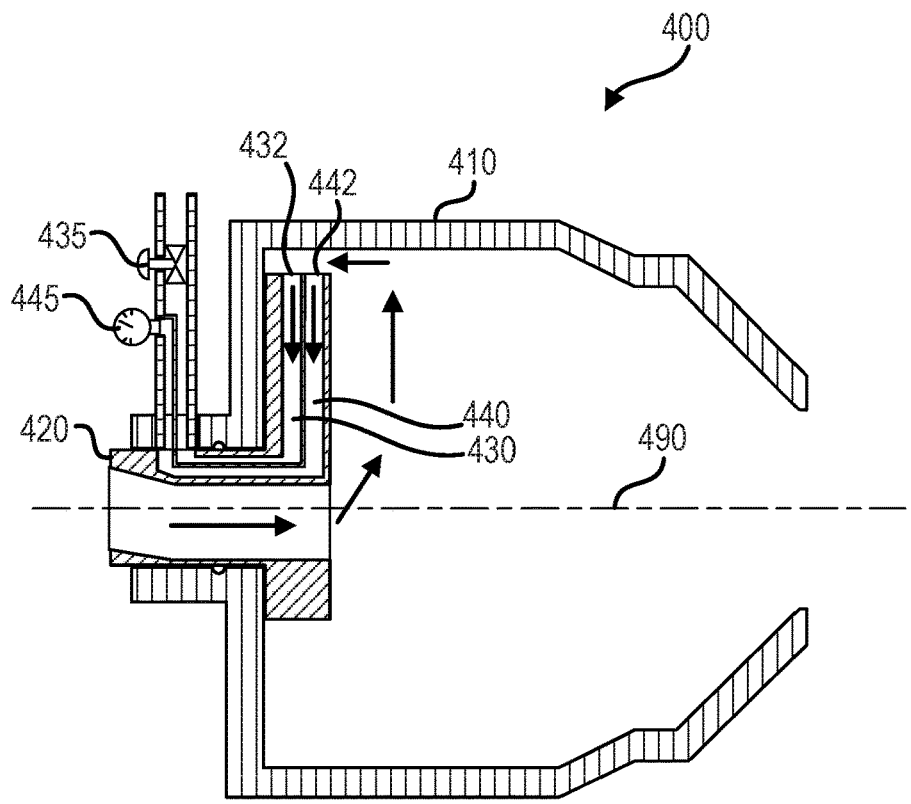
FIG. 4 illustrates a schematic view of a rotary separator having a pickup channel circumferentially aligned with a pitot channel, in accordance with various embodiments.

With reference to FIG. 4, a cross-sectional view of a rotary separator 400 is illustrated, in accordance with various embodiments. In various embodiments, rotary separator 100 may be similar to rotary separator 400, with momentary reference to FIG. 1. Rotary separator 400 may include drum 410 configured to rotate about centerline axis 490. Rotary separator 400 may include a pickup member 420. Pickup channel 430 and pitot channel 440 may be disposed in pickup member 420. In various embodiments, pickup channel 430 and pitot channel 440 may be defined by pickup member 420. Pickup channel 430 may comprise an inlet 432. Pitot channel 440 may comprise an inlet 442. A valve 435 may be coupled to pickup channel 430. A pressure sensor 445 may be coupled to pitot channel 440. In various embodiments, pickup channel 430 may be disposed axially adjacent to pitot channel 440.

Figure 5:
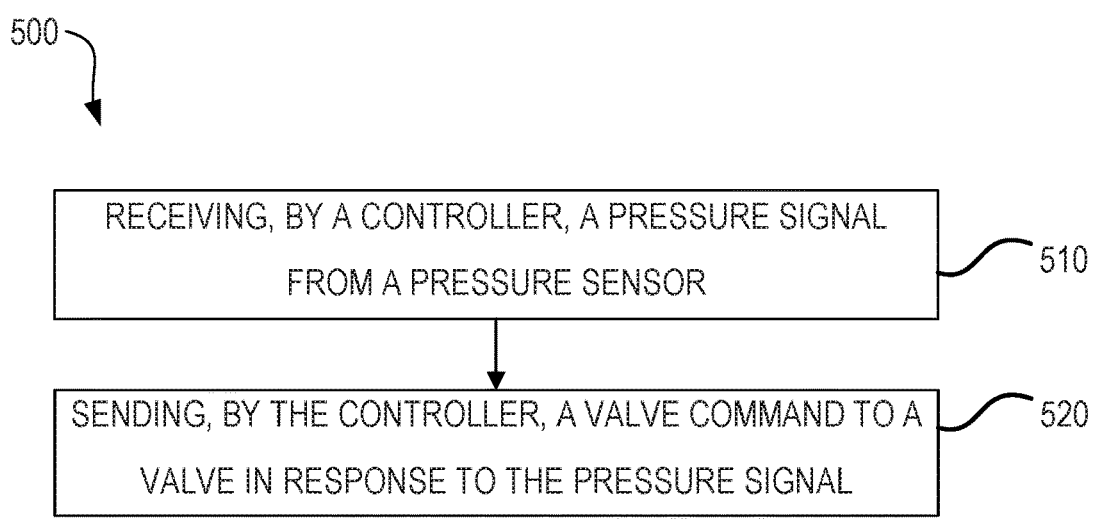
FIG. 5 illustrates a method for draining a liquid from a rotary separator, in accordance with various embodiments.

With reference to FIG. 5, a method 500 for draining a liquid from a rotary separator is illustrated, in accordance with various embodiments. Method 500 includes receiving, by a controller, a pressure signal from a pressure sensor (step 510). Method 500 include sending, by the controller, a valve command to a valve in response to the pressure signal (step 520).

With combined reference to FIG. 1 and FIG. 5, step 510 may include receiving, by controller 150, a pressure signal from pressure sensor 145. Step 520 may include sending, by controller 150, a valve command to valve 135 in response to the pressure signal.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pickup tube for a rotary separator, comprising:
   a pickup member;
   a pickup channel disposed through the pickup member; and
   a pitot channel disposed through the pickup member,
   wherein the pickup channel is configured to receive a liquid from the rotary separator, and
   the pitot channel is configured to receive the liquid from the rotary separator, and
   a first inlet of the pickup channel and a second inlet of the pitot channel are configured to be disposed at an equal distance from a centerline axis of the rotary separator.

2. The pickup tube of claim 1, wherein the pickup member comprises:
   a first orifice defining the pickup channel; and
   a second orifice defining the pitot channel.

3. The pickup tube of claim 2, wherein the pickup member comprises a single piece.

4. The pickup tube of claim 1, wherein the pickup member comprises a third flow channel through which the rotary separator receives a fluid.

5. The pickup tube of claim 4, wherein the fluid comprises the liquid.

6. A rotary separator, comprising:
   a drum configured to rotate;
   a pickup member extending into the drum, comprising:
      a pickup channel having a first inlet for receiving a liquid; and
      a pitot channel having a second inlet for receiving the liquid,
   wherein the liquid exits the drum through the pickup channel in response to a pressure of the liquid being measured through the pitot channel, and
   the first inlet and the second inlet are disposed at an equal distance from a centerline axis of the drum.

7. The rotary separator of claim 6, further comprising a valve coupled to the pickup channel.

8. The rotary separator of claim 7, further comprising a pressure sensor coupled to the pitot channel.

9. The rotary separator of claim 8, wherein the valve moves to an open position in response to the pressure of the liquid being greater than a first threshold value.

10. The rotary separator of claim 9, wherein the valve moves to a closed position in response to the pressure of the liquid being less than a second threshold value.

11. The rotary separator of claim 10, wherein the first threshold value and the second threshold value are predetermined values.

12. The rotary separator of claim 6, wherein the drum comprises an inlet and an exit.

13. The rotary separator of claim 12, wherein the drum is configured to receive the liquid through the inlet and a gas through the inlet, wherein the gas exits the drum through the exit.

14. The rotary separator of claim 10, wherein the pickup member comprises:
   a first orifice defining the pickup channel; and
   a second orifice defining the pitot channel.

15. A method for draining a liquid from a rotary separator, comprising:
   receiving, by a controller, a pressure signal from a pressure sensor in fluid communication with a pitot channel of the rotary separator; and
   sending, by the controller, a valve command to a valve in response to the pressure signal being above a threshold value, wherein the valve actuates between a closed position and an open position in response to the valve command, and the valve is in fluid communication with a pickup channel of the rotary separator;
   the rotary separator comprises a drum configured to rotate and a pickup member extending into the drum,
   wherein the pickup member comprises the pickup channel having a first inlet for receiving a liquid and the pitot channel having a second inlet for receiving the liquid, and
   the first inlet and the second inlet are disposed at an equal distance from a centerline axis of the drum.

16. The method of claim 15, wherein the pickup channel is at least partially defined by a first orifice disposed within a drum of the rotary separator, and the pitot channel is at least partially defined by a second orifice disposed within the drum of the rotary separator.

17. The method of claim 16, further comprising:
   receiving, by the controller, a second pressure signal; and
   sending, by the controller, a second valve command to the valve in response to the second pressure signal being below a second threshold value, wherein the valve actuates between the open position and the closed position in response to the second valve command.

* * * * *